C. Rich,

Spring Bed.

No. 4,285. Reissued Feb. 28. 1871.

Witnesses;
A. Moore
Edw. W. Down

Inventor;
Charles Rich

N. PETERS, PHOTO-LITHOGRAPHER, WASHINGTON, D. C.

United States Patent Office.

CHARLES RICH, OF POUGHKEEPSIE, NEW YORK, ASSIGNOR TO THE METALLIC UNION SPRING COMPANY, OF SAME PLACE.

Letters Patent No. 106,980, dated August 30, 1870; reissue No. 4,285, dated February 28, 1871.

IMPROVEMENT IN SPRINGS FOR BEDS, &c.

The Schedule referred to in these Letters Patent and making part of the same.

*To all to whom it may concern:*

Be it known that I, CHARLES RICH, of Poughkeepsie, in the county of Dutchess and State of New York, have invented a new and improved Construction of Springs, and Mode of Connecting them for Spring-Beds, Cushions, and other Articles; and I do hereby declare that the following is a full, clear, and exact description thereof, reference being had to the accompanying drawing making part of this specification, in which—

Like letters of reference indicate corresponding parts wherever they occur.

Figure 1:
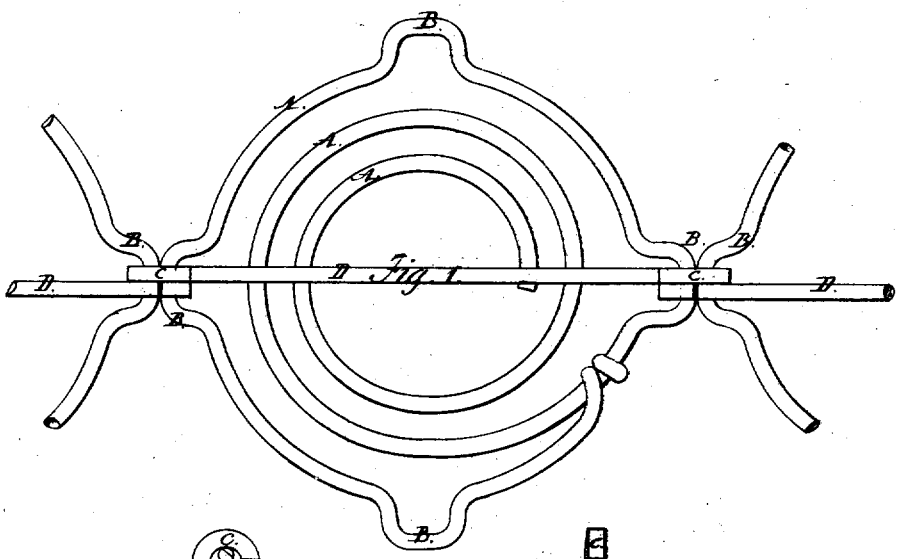
Figure 1 is a plan view of my improved spring.
Figure 2:
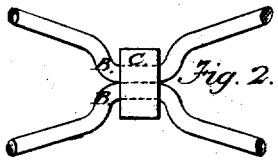
Figure 2 is a detailed view of the bearings, with clasp attached.
Figure 4:
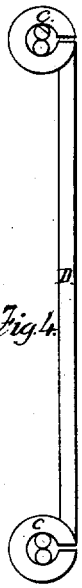
Figure 4 is an end view of the clasps, with rod attached.
Figure 5:
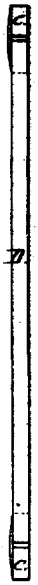
Figure 5 is a top view of clasps with rod attached.
Figure 3:
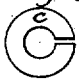
Figure 3 is an end view of the clasp.

The object of this invention is to construct spring beds and cushions with the spiral spiral springs now in common use for upholstering, so that by a simple device they can be secured in proper position without the use of slats, cords, lacing, or boxing, or a rigid frame of any kind, and so that the springs may be used either side up, or rolled or folded up for handling, and so that the bed-bottom may be flexed into any desired shape or form of couch for cripples and the sick.

My invention consists—

First, in bending or shaping the wire of which the spring is composed, so as to form four straight, or nearly straight, bearings, equidistant from each other, with collars upon or angles in the wire at each end of the bearings sufficient to hold clasps or sleeves in place; and Second, in securing the springs together at the bearings by means of sleeves or clasps in such a manner as to form hinged joints at each connection, and thereby allow the structure to be flexed, rolled, or folded up, as desired.

Third, in attaching a rod or reach from clasp to clasp across the ends of the springs when and where required, to prevent the small or central coils of the springs from pressing through.

To enable others skilled in the art to make and use my invention, I will now more minutely describe it.

A in the drawing represents a view of my improved spring.

B B are the bearings formed upon the terminal coils of the springs. I now place these bearings upon a circle some larger than the circle formed by the last coils of the springs, which is done by recessing the wire of the springs outward at those points where bearings are required, thereby forming shoulders or guards at each end of the bearings, as seen in fig. 1; but this particular shape is not entirely essential, as the wire may be bent in any desired shape between the said bearings of the springs, or collars may be applied at the ends of the bearings, and the bearings may be made of any length thought necessary, provided, nevertheless, that there shall be shoulders, collars, offsets, or angles, more or less obtuse, at the ends of the bearings to hold the clasps or sleeves in place, and in such a manner that the springs may be rolled or folded together and the structure flexed into any desired form of couch.

C are the clasps or sleeves, which I use to connect the springs together. These clasps or sleeves may be made of a flat piece of metal, of a width suited to the length of the bearings upon the springs in any given case, and of a length sufficient to inclose the bearings of two springs in each clasp when formed into a ring or oval shape around the bearings, or any other suitable material may be used for connecting the bearings of the springs together equivalent to the sleeve or clasp, that will allow the structure to be rolled or folded up into compact form. At present I prefer and use a clasp made of malleable iron cast with a slight opening on one side sufficient to admit the bearings of the springs, which I then close together around the bearings.

D is a rod or reach, made of a length sufficient to span centrally across the end of a spring. This rod may be attached to the clasps on each side of the springs in any given case when required, their main use being to prevent the center or small coils from pressing through above or below the terminal coils of the springs. They are, therefore, made to take the place of slats, and are used only when slats are dispensed with, and on bed-bottoms made to roll or fold up.

The clasps or sleeves C, when attached to the rods D, may be of a width equal to half the length of the bearings upon the springs, and two clasps may be applied to each bearing instead of one, thereby crossing the rods D over the ends of each spring and at the top and bottom of the mattress alike, if required.

I arrange these springs in rows running at right angles in sufficient numbers to form the desired outline and secure all the adjoining bearings of the adjacent springs to each other by inclosing the bearings of two springs in each clasp at the top and bottom coils of the springs, which forms a light and elastic mattress or cushion susceptible of being rolled, folded, or flexed into any desirable shape or compass.

Having thus described my invention,

What I claim, and desire to secure by Letters Patent, is—

1. The bearings B, constructed and arranged upon the upper and lower coils of the spiral springs, in the manner and for the purposes herein described.

2. The clasps or sleeves C, constructed and combined with the bearings B, so as to form a hinge-joint and allow the structure to be rolled or folded together, substantially as and for the purpose set forth.

3. The rod D, attached to the clasps or sleeves C, in combination with the coiled springs A, substantially as set forth.

CHARLES RICH.

Witnesses:
GILBERT B. TOWLES,
W. BURRIS.